Dec. 16, 1969 R. E. LEVIN 3,484,161

OPTICAL PROJECTION SYSTEM

Filed June 9, 1967

ROBERT E. LEVIN
INVENTOR

BY Lawrence Burns
ATTORNEY

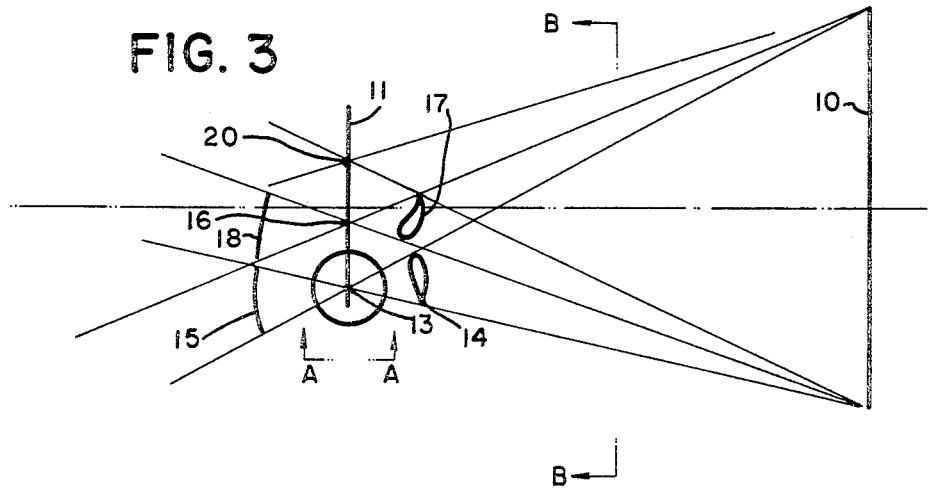
FIG. 3
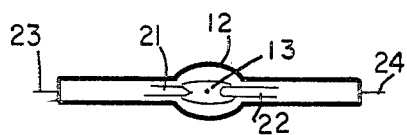
FIG. 4  VIEW A-A
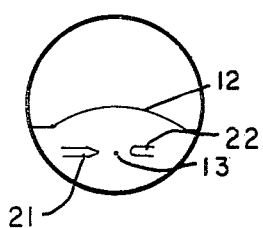
FIG. 5
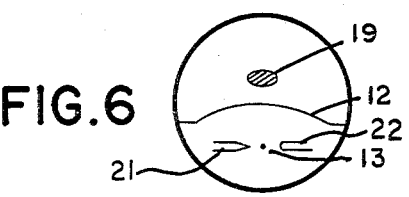
FIG. 6
ROBERT E. LEVIN
INVENTOR
BY *Lawrence Burns*,
ATTORNEY

ROBERT E. LEVIN
INVENTOR

United States Patent Office 3,484,161
Patented Dec. 16, 1969

3,484,161
OPTICAL PROJECTION SYSTEM
Robert E. Levin, Hamilton, Mass., assignor to Sylvania Electric Products, Inc., a corporation of Delaware
Filed June 9, 1967, Ser. No. 644,999
Int. Cl. G03b 21/28, 21/20
U.S. Cl. 353—122
4 Claims

ABSTRACT OF THE DISCLOSURE

An optical projection system used for projecting images on a screen. The optical projection system has a condensing lens, an objective lens having an entrance pupil, an optical axis, a lamp source, a spherical reflector and at least one approximately ellipsoidal reflector. The lamp source is offset from the center of the optical axis and is positioned to fill only part of the entrance pupil by light reaching the pupil directly and forwardly of the lamp. The spherical reflector is positioned to reflect some of the rearwardly-directed light from the lamp back through the lamp to the entrance pupil in the same direction as light emanating forwardly from the lamp. The approximately ellipsoidal reflector has one focus at the center of the lamp and another in the same plane as the lamp traversed to the optical axis, to fill a part of the condensing lens other than that filled directly by the lamp itself.

BACKGROUND OF INVENTION

Field of invention

The invention relates to optical projection systems, such as are used for projecting images on a screen, as with slide projecting for example, and especially to systems suitable for use with so-called "short-arc" lamps of the electric discharge type, where variations in the arc dimensions and position are greater than with incandescent sources. The invention can also be used with incandescent and other sources, however.

DESCRIPTION OF PRIOR ART

Conventional large format projection devices operate on the principle that a source of luminous flux is imaged on the entrance pupil of an objective projection lens by a condensing lens. The objective images the aperture on a screen. The condensing lens is at least as large as the maximum dimension of the aperture, and only flux passing through both the entrance pupil and the aperture can reach the screen.

Since the source is not imaged in the aperture, it is not imaged on the screen. Regardless of source non-uniformities, the aperture is uniformly irradiated; thus the screen is uniformly irradiated in the absence of a film in the aperture. This is obvious since each point on the source completely and uniformly irradiates each point on the condensing lens and consequently the aperture. The above description has been idealized, since the screen is never completely uniform due to practical considerations such as objective vignetting, the cosine fourth "law," nonisotropic source points, and the like. Also practical systems may vary by using multi-element condensers, reflectors behind the source to fill voids in an incandescent filament pattern, and the like. The active part of the source is determined by the entrance pupil of the objective lens as seen in source space where it serves as a system stop. A filament smaller than the specified stop does not fill the objective lens exit pupil. A filament size equal to or greater than this stop does fill the exit pupil. Unless the filament conforms to this condition, the total screen flux is proportional to the percentage fill since $$F = \int_S \int_W B(S,w)\tau(S,w)dwdS$$

In the above equation, F is the screen flux in lumens, B is the source luminance expressed in lumens per square foot—steradian, $w$ is the solid angle of the exit pupil of the objective lens as seen from the point $dS$ on the screen, $\tau$ is the system transmittance and S is the screen area, in square feet. Many other forms of system illumination have been devised, but the described system has been used almost universally for large formats and incandescent sources.

Once the constance of the objective lens have been set by other factors, $w$ cannot be increased. The maximum screen flux is obtained when the exit pupil of the objective lens is completely filled (or flashed, if we use the new terminology) with the source. Then the screen flux can only be increased by increasing the source luminance. The luminance of incandescent sources is limited by the melting point of tungsten. This leads to the use of arc discharge sources to obtain higher source luminance. The magnification of the condensing system is limited by aberrations and the difficulty of producing aspheric lenses. Therefore the entire stop normally cannot be filled without the use of excessive power if the arc source is placed directly at the axis. Many schemes have been used to negate this difficulty. Often flux not accepted by the condensing lens is redirected through the interelectrode arc space by reflectors. This is usually inefficient since the arc envelope is thick and non-uniform in small concentrated arc lamps. Reflector condensing systems can and have been used to replace the lens condenser.

In most cases the arc electrodes and their protective envelopes cause screen non-uniformities, particularly when the reflector is made deep for high efficiency. This is most serious for slow objective lenses since each region of the film gate aperture is irradiated by only a small region of reflector surface (effective system-transmitted irradiation component). Beam splitting schemes, arc image inversion-super-position schemes, and other similar ideas normally increase the complexity, cost, size, and alignment difficulty of the system. Also uniform irradiance over the aperture is difficult to obtain and maintain in practice without a condensing lens since this lens acts as a field lens for the system. Finally, any reflector relied on for precise control requires approximately ¼ the tolerance limits permitted for a comparable lens system (this is a well-established fact based on the ray deviation $\Delta\varphi$ produced by a control boundary deviation $\Delta\theta$. Reflector condenser systems have their greatest advantage in small format systems where uniformity can be attained by brute-force techniques of overfill or in large format systems if the arc source is large as in motion picture theatre projectors.

SUMMARY OF INVENTION

I have discovered that the above problems can be obviated by placing the source of luminous flux, such as, for example, an arc or incandescent lamp off the optical axis of the lens system, using a condenser lens otherwise in the usual manner, but placing a reflector, preferably spherical, to produce additional real image sources in source space in an isotropic manner with respect to the clear aperture of the condensing lens. This system avoids the necessity for a complex, costly, highly sensitive system to use all of the flux generated by the source, and the addition of the real image sources increases the fill of the exit pupil of the objective lens, thereby increasing the flux incident on the screen.

The additional real image sources we obtained by using ellipsoidal reflectors with one focus at the actual lamp source and another focus at which the image is formed and through which light passes to illuminate the lens.

Because of the isotropic nature of the real image sources, the system is relatively insensitive to small source position differences, and permits higher mechanical tolerances in the design and positioning of the arc tube or lamp. The previously-used systems apportioned the flux zonally to various parts of the system, and such systems were inherently quite sensitive to the position of the source. Brute-force methods of overfilling the lens and of using excessive power were the only means of overcoming this defect in the prior systems, and they were expensive and inefficient. My invention permits the efficient use of the source, and so does not require overfill nor excessive power. The principles of my invention can also be used, but less advantageously, if the source is placed on the optical axis, with some of the reflectors being off the axis.

BRIEF DESCRIPTION OF DRAWINGS

Other objects, advantages and features of the invention will be apparent from the following specification taken in connection with the accompanying drawings, in which:

FIGURE 3 is a schematic diagram of of an embodiment of my invention;

FIGURE 4 is a schematic drawing of an arc tube operating with an arc according to the invention;

FIGURE 5 shows schematically how the exit pupil of the objective lens appears under one set of conditions;

FIGURE 6 shows schematically how the exit pupil would appear under different conditions;

DETAILED DESCRIPTION OF SPECIFIC EMBODIMENTS

Figure 1:
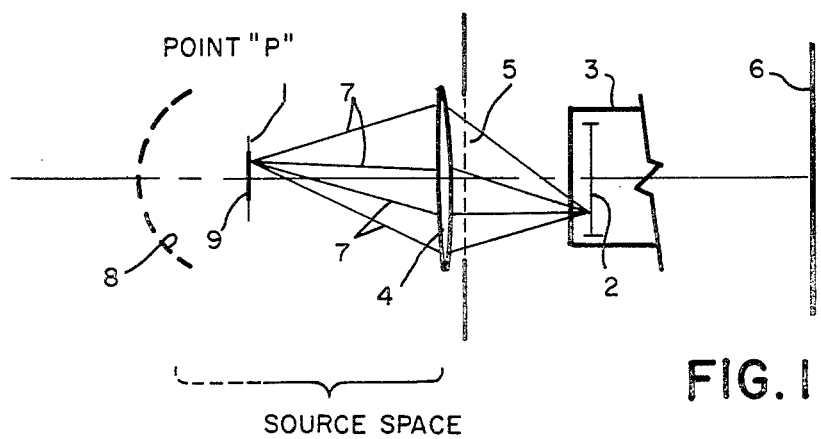
FIGURE 1 is a schematic diagram of the previously-used optical system.
Figure 2:
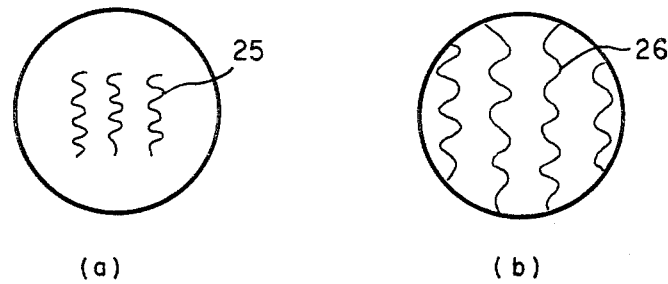
FIGURE 2(a) is a schematic drawing showing how the image of a filament fails to fill the pupil of the condenser lens.
FIGURE 2(b) is a schematic drawing showing how the image of a filament can fill or overfill the condenser lens.

Conventional large format projection devices operate on the principle illustrated in a meridian plane section of FIGURE 1. A source of luminous flux 1 is imaged on the entrance of pupil 2 of an objective (projection) lens 3 by a condensing lens 4. The objective 3 images the aperture 5 on a screen 6. The condensing lens 4 is at least as large as the maximum dimension of the aperture 5. Only flux passing through both the entrance pupil 2 and the aperture 5 can reach the screen 6. Since the source 1 is not imaged in the aperture 5, it is not imaged on the screen 6. Regardless of source non-uniformities, the aperture 5 is uniformly irradiated; thus the screen 6 is uniformly irradiated in the absence of a film in the aperture 5. This is obvious since each point on the source 1 completely and uniformly irradiates each point on the condensing lens 4 and consequently the aperture 5. This is illustrated for point P by the rays 7. This discussion has been idealized since the screen 6 is never completely uniform due to practical considerations such as (a) objective vignetting, (b) the cosine fourth "law" (c) source points are non-isotropic, and the like. Also practical systems may vary by using multi-element condensers, reflectors 8 behind the source to fill voids in an incandescent filament, and other details. The active part 9 of the source 1 is determined by the entrance pupil 2 of the objective lens as seen in source space where it serves as a system stop 9. Look back into the objective 3 from the screen 6 as shown in FIGURE 2. A filament smaller than the specified stop 9 does not fill the objective lens exit pupil as shown in FIGURE 2(a). A filament equal to or greater than this stop does fill the exit pupil as shown in FIGURE 2(b). Until the condition of FIGURE 2(b) is met, the total screen flux is proportional to the percentage fill, as explained in an earlier part of this application.

Once the objective lens has been set by other factors, $w$ cannot be increased. The maximum screen flux is obtained when the exit pupil of the objective lens is completely filled (or "flashed" if we use the new terminology) with the source. Then the screen flux can only be increased by increasing the source luminance. The luminance of incandescent sources is limited by the melting point of tungsten. This leads to the use of arc discharge sources to obtain higher source luminance. The magnification of the condensing system is limited by aberrations and the difficulty of producing aspheric lenses. Therefore the entire stop 9 normally cannot be filled without the use of excessive power if the arc source is placed directly at 1. Many schemes have been used to negate this difficulty. Often flux not accepted by the condensing lens is redirected through the interelectrode arc space by reflectors. This is usually inefficient since the arc envelope is thick and non-uniform in small concentrated arc lamps. Reflector condensing systems can and have been used to replace the lens condenser.

In most cases the arc electrodes and their protective envelopes cause screen non-uniformities, particularly when the reflector is made for high efficiency. This is most serious for slow objective lenses since each region of the film gate aperture is irradiated by only a small region of reflector surface (effective system-transmitted irradiation component). Beam splitting schemes, arc image inversion-super-position schemes, and other similar ideas normally increase the complexity, cost, size, and alignment difficulty of the system. Also uniform irradiance over the aperture 5 is difficult to obtain and maintain in practice without a condensing lens since this lens acts as a field lens for the system. Finally, any reflector relied on for precise control requires approximately ¼ the tolerance limits permitted for a comparable lens system (this is a well-established fact based on the ray deviation $\Delta \varphi$ produced by a control boundary deviation $\Delta \theta$. Reflector condenser systems have their greatest advantage in small format systems where uniformity can be attained by brute-force techniques of overfill or in large format systems if the arc source is large as in motion picture theatre projectors.

The invention to be disclosed herein obviates the problems just discussed for arc sources. This design will be described for a 35 mm. slide projector where the arc is small and of low power; however the principles involved are universal. The retention of condensing lenses provides the advantage of screen uniformity plus the interchangeability of incandescent and arc sources. A large conventional incandescent source can replace the arc-plus-reflector or a small incandescent source can replace the arc source with the retention of the reflector. It also has the prime advantage of eliminating the normal small tolerances of reflector condenser systems. In FIGURE 3 consider the meridian plane trace through the projector. The first surface of the condensing lens system 10 and the entrance pupil of the objective lens as viewed in the source space 11 are shown. Any ray from the source that intercepts these two areas will pass through the system. Locate the arc tube 12—see FIGURE 4—off-axis with the arc 13 near the lower edge of the stop 11. This tube alone will produce uniform screen illumination since any point in the stop area has that property of uniform illumination. This arc will not fill the exit pupil of the objective lens since the plane 11 is not made completely luminous. Consequently the maximum possible screen flux has not been attained. FIGURE 5 shows how the exit pupil of the objective would appear in this situation when viewed from the center of the screen. Flux not in the solid angle 14 does not pass through the system. Since approximately ½ of the envelope is outside of the stop 11, the greatest opportunity for redirecting flux through the system exists. More of the radiated flux from the lamp may be collectable if the lamp is centered, but the full envelope in the stop produces much greater losses. Additional spherical reflectors in front of the lamp may collect more flux and put it on the primary reflectors to be described, but the practical difficulties do not make this desirable. Place a spherical reflector 15 behind the arc and center it on point 13. This is sized to just fill the solid angle cone 14 defined by the condenser surface 10 and point 13. This is not extremely effective due to the thick, non-uniform envelope, but it is still of practical import. The flux in this zone cannot readily be utilized in any other form. This spherical reflector essentially reimages the arc back onto itself.

Figure 7:
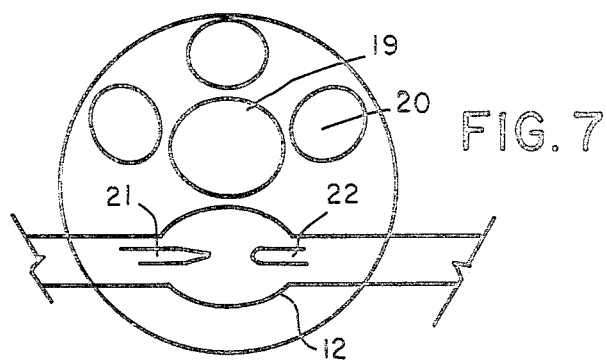
FIGURE 7 is a view along the optic axis of an embodiment of the invention, showing the complete reflector and lamp.
Figure 8:
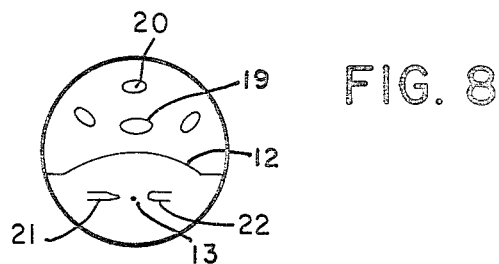
FIGURE 8 shows schematically how the exit pupil of the objective lens would appear in this situation when viewed from the screen.

Next choose a point 16 in the stop area near point 13 but such that the solid angle cone it defines 17 will not intercept the lamp envelope. Use points 13 and 16 to define the focii of an ellipsoid and form that part of the ellipsoid 18 that intercepts the solid angle 17. Here flux from the arc 13 collected by reflector 18 is redirected to point 16 where it can be completely utilized by the optical system. Point 16 acts as a real isotropic source from the viewpoint of the clear aperture of the condenser 10. The finite size of the arc 13 causes a finite spread of flux at 16, and of course this is necessary to provide a finite flux transfer with a source of finite luminance. Providing the reflector 18 slightly exceeds the solid angle 17, the psuedo-isotropic form of the real image it produces makes the alignment completely non-critical within a specified upper limit, i.e. within that limit of motion no effect is produced on the screen flux or uniformity. FIGURE 6 shows how the exit pupil of the objective would appear in this situation when viewed from the center of the screen. The effective source provided by 16 is shown at 19. This process is repeated for other points in the stop area 11 such as point 20. These will not all lie in the same meridian plane. A view along the optic axis in FIGURE 7 shows the complete reflector and lamp. FIGURE 8 shows how the exit pupil of the objective lens would appear in this situtaion when viewed from the center of the screen. The exact number and placement of ellipsoidal segments depends entirely on the optical system it is to match. In some systems the small ellipsoidal segment may be approximated by a spherical segment. This in no way changes the concept since the sphere has imaging properties similar to the ellipsoid; however, the aberrations of the sphere become large much faster as the system departs from a paraxial system.

The arc electrodes 21, 22, are shown schematically in FIGS. 4 through 8 with the usual lead-in wires 23, 24 attached to them.

The filaments 25 are shown schematically in FIG. 2(a), and are the filaments 26 in FIG. 2(b).

Although the invention is described with request to a specific embodiment, various modifications therein will be approved from the present specification without departing from the spirit and scope of the invention, the scope being limited only by the claims.

What I claim is:

1. An optical projection system comprising a condensing lens, an objective lens having an entrance pupil imaged through said condensing lens, an optical axis, a lamp source of light offset from the center of said optical axis and in position to fill part only of the entrance pupil by light reaching said pupil directly and forwardly from said lamp, a spherical reflector in position to reflect some of the rearwardly-directed light from said lamp back through said lamp to reach said entrance pupil in the same direction as light emanating forwardly from said lamp, and at least one approximately ellipsoidal reflector segment having one focus substantially at the center of the light-emitting portion of said lamp and another in the same plane as the lamp transverse to the optical axis, to fill a part of said lens other than that filled directly by the lamp itself.

2. The optical projection system of claim 1, in which additional ellipsoidal reflector segments have one focus substantially at the light-emitting portion of the lamp and another focus at a different point in the plane of the lamp transverse to the optical axis of the lens, said point being in a position in said plane different from that of the focus of any other ellipsoidal reflector in the combination, whereby the light reflected by said ellipsoidal reflectors passes through said focii to illuminate the entrance pupil of the objective lens at a point different from that reaching said pupil directly from said lamp.

3. The combination of claim 1, in which the light source is a short-arc electric discharge lamp.

4. The combination of claim 2, in which the light source is a short-arc electric discharge lamp.

References Cited

UNITED STATES PATENTS

| 1,248,456 | 12/1917 | Clark _____ 240—41.3 XR |
| 2,192,886 | 3/1940 | Bergmans et al. |
| 2,771,001 | 11/1956 | Gretener. |
| 3,038,372 | 6/1962 | Lessman. |
| 3,076,377 | 2/1963 | Brownscombe. |

NORTON ANSHER, Primary Examiner

R. P. GREINER, Assistant Examiner

U.S. Cl. X.R.

240—41.3; 353—99, 102